April 8, 1969    W. B. EWING    3,437,538

METHOD OF FORMING AN EXTRUDED SUNSCREEN

Original Filed Aug. 10, 1961    Sheet 1 of 2

INVENTOR.
WALKLEY B. EWING
BY
*Price & Heneveld*
ATTORNEYS

April 8, 1969 W. B. EWING 3,437,538
METHOD OF FORMING AN EXTRUDED SUNSCREEN
Original Filed Aug. 10, 1961
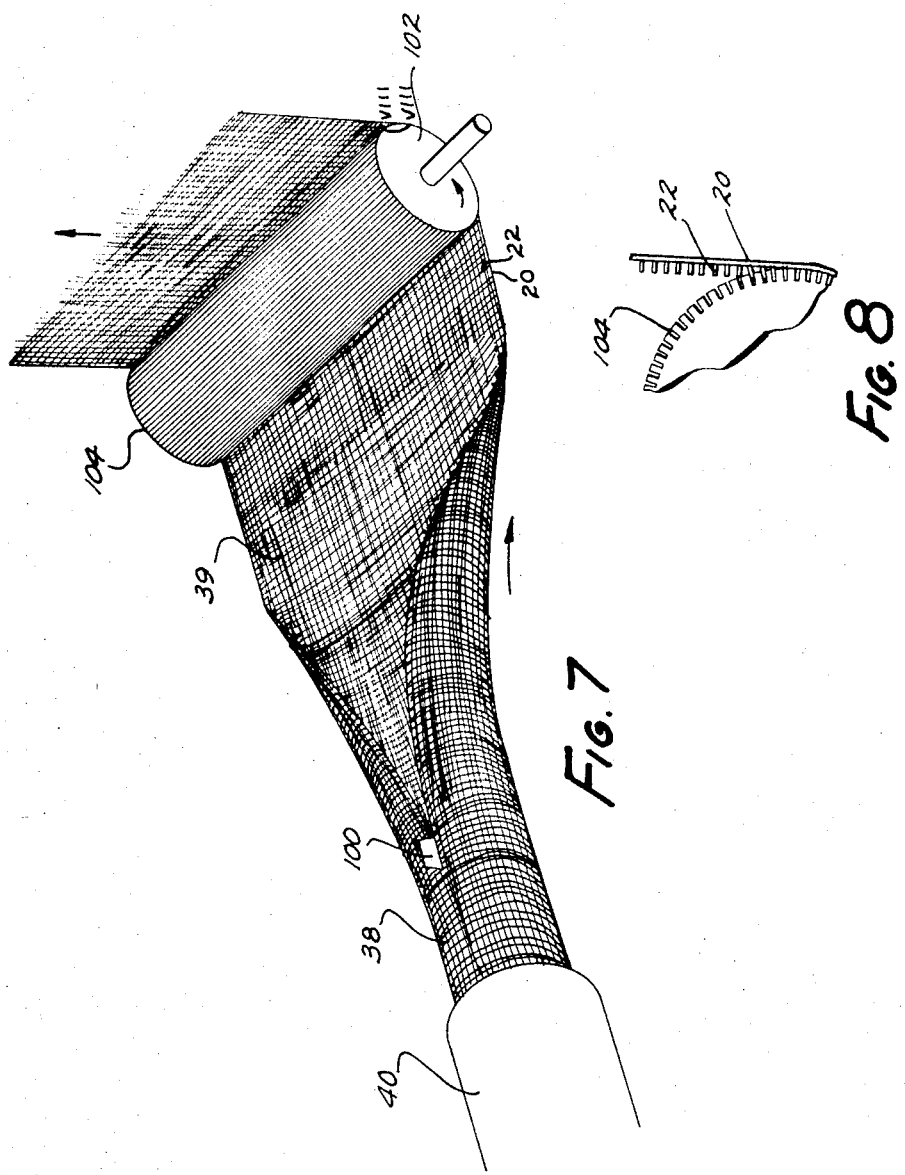
INVENTOR.
WALKLEY B. EWING
BY
ATTORNEYS United States Patent Office 3,437,538
Patented Apr. 8, 1969

3,437,538
METHOD OF FORMING AN EXTRUDED SUNSCREEN
Walkley B. Ewing, Fajardo, Puerto Rico, assignor, by mesne assignments, to Sunscreen Corporation, Fajardo, Puerto Rico, a corporation of Puerto Rico
Original application Aug. 10, 1961, Ser. No. 130,524, now Patent No. 3,276,942, dated Oct. 4, 1966. Divided and this application Feb. 14, 1966, Ser. No. 560,397
Int. Cl. B29c 24/00; B29d 23/04
U.S. Cl. 156—167    3 Claims

ABSTRACT OF THE DISCLOSURE

A method of forming a sunscreen by continuously extruding in a cylindrical helical pattern a plurality of parallel first plastic members and simultaneously continuously extruding a plurality of second plastic members arranged in a cylindrical pattern coaxial to the first pattern. Second members extend in a direction parallel to the axis of the cylindrical pattern.

The first extruded members constantly rotate about the axis to form a helix with the second members located at spaced intervals around the circumference of the helix. After the members are extruded in the cylindrical pattern they are cut longitudinally of the cylinder leaving a substantially flat piece. Louvers are constructed of a material such that when subjected to solar radiation they will soften and droop so as to provide variable light entry control.

---

This invention relates to sunscreens, and more particularly to sunscreens having louvers of elongated cross-section to control light entry.

This application is a division of patent application Ser. No. 130,524 filed Aug. 10, 1961 and entitled "Extruded Screen," now Patent No. 3,276,942.

In the usual manufacture of screens known as sunscreens, which can be made to function not only as a light shade, but may also function as an insect barrier, narrow metallic louvers having an elongated cross-section (i.e. having a width greater than the thickness) are interwoven with supporting warp wires in an intricate fashion as disclosed, e.g. in Patent No. 2,194,222 to Ewing, by using expensive weaving machines. The spacing of these louvers of bronze or the like from each other is generally in the order of 0.050 inch, the louvers having a thickness of about 0.002 to 0.005 inch, a width of about 0.025 to 0.10 inch, and a length of several inches or feet as needed.

To form one of these sunscreens, a large number of the louvers must be produced, making certain that the same louver width is maintained. These louvers are delicately interwoven with supporting warp wires, with each wire weaving back and forth around the lower edges and then around an adjacent wire to form a series of tiny pockets for the louvers. The wires must be woven tightly enough to hold all of the louvers exactly parallel and at the desired angle. The woven sunscreen, although formed of expensive bronze or the like, must usually then be coated with a corrosion inhibitor. The resulting product possesses commendable attributes but is expensive to produce due to its intricate, delicate and costly assembly operations. Further, the machinery necessary to weave the sunscreen is complex and costly.

In the light of these factors, it has become increasingly important to discover a sunscreen product which could be produced using less expensive and less delicate methods, and from materials more abundant and lower in cost than those presently required for the metal product.

Accordingly, it is an object of this invention to provide a sunscreen fully capable of functioning as an effective light entry shade, and if desired as an insect barrier, but costing only a fraction of the cost of prior structures.

Further objects are to provide such a screen formed from inexpensive raw materials; which does not require delicate metal louvers and interwoven warp elements; which comprises one integral member; which actually possesses automatically variable light entry control; the properties of which can be altered to vary the minimum and maximum light entry and also the rate of variation of light entry; which does not require corrosion-preventing coatings; and the manufacture of which is continuous and rapid.

A further object is to provide a simple rapid method of forming a low-cost, effective, variable-light-control integral sunscreen.

Additional objects are to provide a method of forming the novel sunscreen in a flat usable material and to provide sunscreen straightening and aligning apparatus.

These and several other objects will be apparent from a scrutiny of the following specification when studied in conjunction with the drawings in which:

FIG. 7 is a perspective view showing the cutting and straightening steps of the novel process and the apparatus used therefor; and FIG. 8 is a fragmentary perspective view taken on lines VIII—VIII of the straightening drum illustrated as part of FIG. 7.

Basically, the invention comprises a sunscreen having parallel plastic supporting strands or warp members in one direction, parallel plastic louvers of elongated cross-section in a second direction at an angle with respect to the warp elements, and with one edge of the elongated louvers integral with the warp members to form an integral sunscreen. Variable light entry is obtained by downward bending of the louvers when subjected to solar radiant energy due to heat energy generation causing several reactions, including (1) expansion of the surface of the louvers which is directly radiated, (2) softening of the plastic louvers to cause droop, and (3) softening and expansion of the warp elements to thereby lessen tension on the louvers and allow them to sag slightly. With a decrease in the radiant energy, the plastic becomes more rigid, with the louvers returning to their original position due to contraction of the cooled plastic in the louvers, "plastic memory" of the material, and tensioning of the cooled warp elements.

The integral sunscreen is formed by extruding the warp members and louvers simultaneously and continuously from coaxial dies moving with respect to each other. The resulting cylindrical netting is continuously slit along a path perpendicular to the louvers to produce the sunscreen. The continuous sheet of sunscreen is then preferably pulled around a heated cylindrical drum having louver receiving slots around its periphery to heat the plastic material and cause it to flatten from its previous somewhat arcuate shape. The slits simultaneously reorient the louvers to the preferred angle, usually approximately 90°, with respect to the warp elements.

Figures 1, 1A:
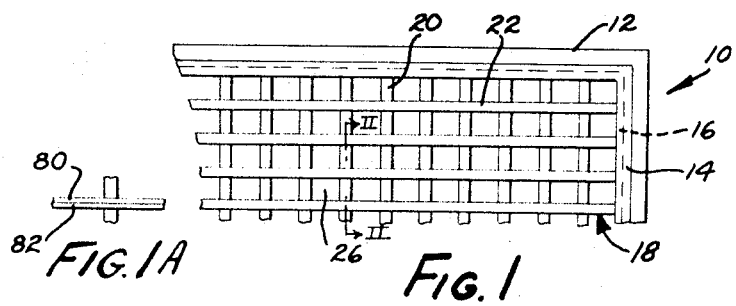
FIG. 1 is a fragmentary enlarged elevational view of the novel sunscreen embodied in a typical use.
FIG. 1A is a fragmentary, enlarged, elevational view of an alternative form of a portion of the novel screen.

Referring now to FIG. 1, the sunscreen 10 there depicted may include a suitable frame 12 with a peripheral retaining strip 14 to hold the peripheral edge 16 of the sunscreen mesh 18. This frame may or may not be incorporated, depending upon the particular use to which the sunscreen is to be put. This sunscreen is composed of warp members 20 and louvers 22. The louvers have an elongated cross-section, i.e. the breadth from 24 to 25 is greater than the thickness from 60 to 62. Edge 24 (FIG. 2) of each of these louvers 22 is integral with the plurality of warp members or support strands 20 to provide a one-piece or unitary screen.

The screen may be mounted by virtue of frame 12 into a window, if desired. It may be formed with small openings 26 to prevent the entry of insects through the window. Alternately, the screen may be composed of relatively large louvers, and warp elements, and openings. Thus, the dimensions thereof may be varied to suit the particular environment.

The screen material will form an excellent draping screen to cover a whole wall, if desired, as to shade a porch, to form a sun shade for large chicken enclosures, or to shield office workers from a skylight. Many other adaptations will readily occur to those in the field.

The unique integral sunscreen is formed from extrusion dies 40 and 42. In coplanar faces of these circular dies and adjacent the common junction, seen as circle 44, are a plurality of extruding orifices. Orifices 46 in the inner periphery of outer die 40 allow the extrusion of a plurality of parallel warp members 20, while the elongated orifices 48 in the outer periphery of inner die 42 allow extrusion of a plurality of parallel louvers 22. The extended inlet to orifice 48 includes a bottom surface 48″ and a pair of walls 48′. It will be obvious that these groups of orifices may be placed on either die to obtain equivalent structures. These dies are rotated with respect to each other as indicated by the arrow in FIG. 3 at a desired speed to vary the intersecting angle of the louvers with the warp members. I.e., the parallel warp members 20 are extruded in an outer cylindrical pattern while the parallel louvers 22 are co-extruded in a second cylindrical pattern coaxial with and inside the warp pattern. By rotating one (or both) of the dies, here the inner die, the paths of the members forming the pattern may be made to cross. Since the plastic strips are co-extruded, they emerge from the orifices as an integral cylindrical netting.

The number of louver extrusion openings 48 is here shown to be three in number, with twelve warp element openings 46 for cooperation therewith. This may be varied as desired depending upon the diameter of the dies, the viscosity of the plastic material used, the desired closeness of the louvers and/or warp elements, and the like. For purposes of convenience, the dies are here illustrated as of relatively small diameter with respect to the extruded elements. It is to be understood that the operating extrusion dies will be many, many times larger than the orifices, but would not show the details adequately if drawn thusly. Thus, by controlling the extrusion angles, the diameter of the dies, the number of openings and the rate of rotation of one die with respect to the other, the characteristics of the netting 38 comprising formed members 20 and 22 can be accurately controlled to provide the ideal sunscreen for the purpose. The circular junction of the dies is preferably a few feet in diameter to form a netting several feet in circumference. Obviously, this also is greatly variable.

To form the sunscreen from the cylindrical netting, the cylinder is continuously slit in a path perpendicular to the parallel louvers so as to be parallel to the parallel warp members in the final products, as illustrated in FIG. 7. A knife edge 100 may be used, or its equivalent.

Figures 4, 6:
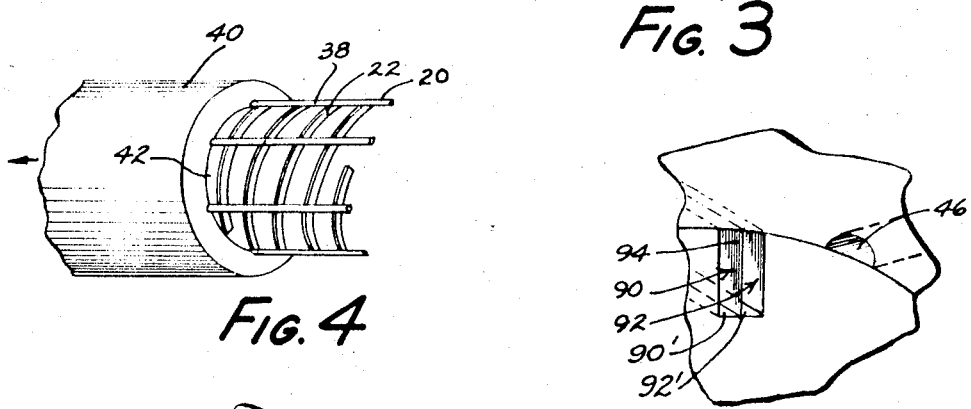
FIG. 4 is a perspective view of the dies of FIG. 3 extruding a cylindrical netting used to form the sunscreen.
FIG. 6 is a fragmentary enlarged elevational view of a portion of slightly modified extruding dies.
Figure 5:
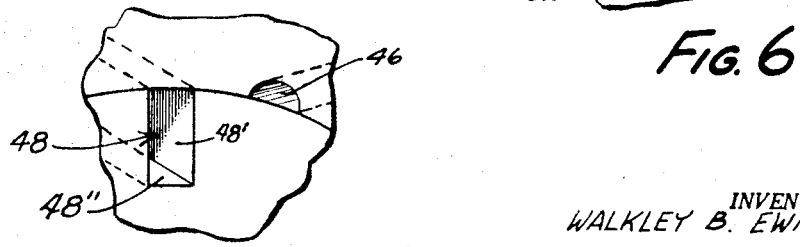
FIG. 5 is a fragmentary enlarged elevational view of a portion of the dies in FIG. 3 showing the extrusion orifices.

The resulting netting 38, after being slit, is as in FIG. 7. Due to its previous cylindrical configuration, the plastic material will tend to retain some arcuate configuration with the center having a sagging tendency. Further, the angle between the spiraling extruded louver (see FIG. 4) and the warp elements is not a perfect 90° as is often desired for the finished product.

To remove this sag, and to simultaneously impart the exact desired angle between the warp elements and the louvers, the slit sheet 39 is guided over a cylindrical drum 102 heated by steam or by a suitable electrical heating means inside the drum. The peripheral surface of the drum possesses longitudinal louver-receiving slits 104. These slits may be oriented parallel with the axis of rotation of the drum to reorient the angle of the louvers to 90° with respect to the warp elements. Alternately, these slits may be slightly askew with respect to the axis to provide another desired angle to the louvers. The heat from the drum necessary to soften the plastic and allow reorientation of the louvers and removal of the sag to flatten the screen material will of course vary with the plastic used. This is a matter within the ordinary skill of these in the plastics art.

The resulting integral article is thus very inexpensively and quickly produced in a one-step process from inexpensive molten plastic such as polypropylene, polyethylene, or co-polymers thereof, as just a few examples. Of course the material used will vary with the particular characteristics desired in the sunscreen.

When the sunscreen is installed, the louvers 22 project outwardly so that radiation from the sun, comprising light and radiant heat, is directed against upper surface 60 of each louver 22. This surface may be dark in color and dull to maximize radiant heat absorption. With increasing radiation, the increased heat absorbed causes a combination of effects to occur in the louvers, including partial softening of the louvers and expansion of the louver, especially the upper surface. The greater the light, and consequently the greater the heat, the more the louvers are deformed downwardly to effectively diminish the light entering the window. Simultaneously the warp members expand and soften to relax the tension on the louvers and allow them to sag slightly. This automatically controls the light entering through the screen during the entire day. When the radiant energy diminishes, the louvers give up their absorbed heat, thereupon the thermal contraction of both the louvers and the warp members, plus the "plastic memory" of the louver material causes them to straighten and revert to their original position.

By altering the degree of darkness and dullness of upper surface 60 of the louvers, the amount of radiation absorption may be varied to thus calibrate the deflection of the louvers with heat and light.

It should be noted that for most effective operation, the heat conductivity between the upper surface 60 and the lower surface 62 should be small to impart the different properties to the surfaces. Upper surface 60 should further have a relatively large co-efficient of thermal expansion.

Figures 2, 3:
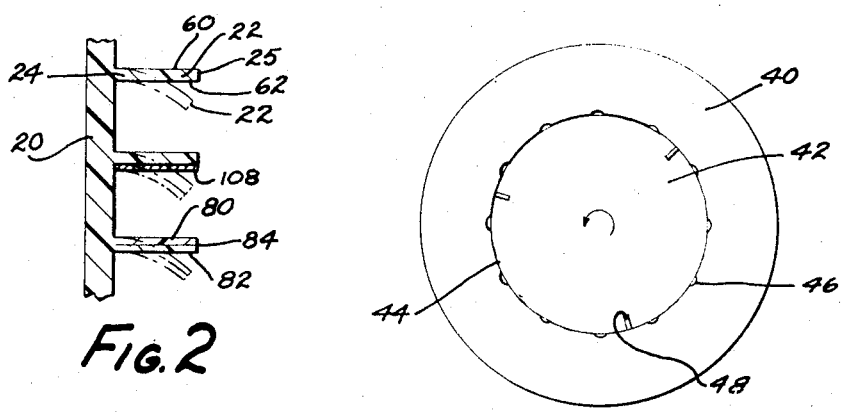
FIG. 2 is a fragmentary sectional end view of the sunscreen of FIG. 1, taken on plane II—II.
FIG. 3 is an elevational view of the extruding dies used to form the novel sunscreen.

If a very large differential in properties is desired between the two surfaces to magnify the closing and controlling feature, the louvers may be formed in layers of separate materials including top layer 80 and bottom layer 82 as depicted in FIGS. 1 and 2. The upper surface may thus be very easily provided with very good radiant heat absorption qualities, and a high coefficient of thermal expansion, while lower surface 82 bonded thereto has good resiliency and poor heat absorption. The amount of heat conducted from the upper layer to the lower layer is practically nil due to the transfer barrier 84 existing on the intersection of the two layers. The effectiveness of the two-plastic louver can be further enhanced by using certain plastics which have been irradiated to alter the coefficient of thermal expansion.

This two-plastic strip may be formed in a manner similar to the one plastic strip. However, in place of each louver extruding orifice 48 normally used, a pair of adjacent orifices 90 (having a bottom surface 90′) and 92 (having a bottom surfaces 92′) (FIG. 6) for the different materials are substituted. These may be separated by a recessed knife edged divider wall 94. Thus, upon being extruded, the two adjacent hot and soft strips would first fuse with each other and then would coextrude with the crossing warp members from orifices 46.

Alternatively, the louver surface 62 of the louvers could be coated with a thin metallic layer to make them even more responsive to radiant energy variations. The metal 108 could be coated by any of several conventional methods, e.g. vapor deposition.

Other materials besides metal could be used for the undercoat such that a variable expansion would occur with heating. This film could be of a relatively non-expanding material, if desired.

Instead of the two layers of the modified louver differing just in respect to their coefficients of expansion, they may also vary in color, or in modulus of elasticity, or in other characteristics or a combination thereof.

To maintain a tighter sunscreen even during the brightest days, the warp members can be extruded of a material having a low coefficient of thermal expansion and poor heat absorption characteristics as contrasted to the upper surface of the louvers.

It will be readily seen by those having ordinary skills in the art that the resulting sunscreen possesses great potential and fills a definite need in this field due to its unique functional and structural characteristics, and due to the simplicity, inexpensiveness, and rapidity of its manufacture.

I claim:

1. The method of forming a sunscreen comprising the steps of, continuously extruding in a cylindrical helical pattern a plurality of parallel first plastic members; simultaneously continuously extruding a plurality of second plastic members arranged in a cylindrical pattern coaxial to said first pattern, said second members extending in a direction substantially parallel to the axis of said cylindrical pattern; constantly rotating said first extruded members about said axis and moving said first and second members longitudinally of said axis to form a helix of said first members with said second members located at spaced intervals around the circumference of said helix and being substantially perpendicular to said first members; one of said members having a cross-section transverse to its length forming a top, bottom and two sides the dimensions of said sides between said top and bottom being substantially less than the dimension of said top and bottom between said sides such that when subjected to solar radiation said one member when attached at one end softens and droops at the other end so as to provide variable light entry control; uniting the said first and second members at their cross-over points and at one of said sides of said one member to form a cylindrical netting; slitting said cylindrical netting in a direction longitudinally of said axis to form a flat sunscreen with the said one members being the louvers and the other members being the warps supporting the louvers.

2. The method in claim 1 including the step of reforming the sunscreen netting characterized by a residual generally-arcuate cross-sectional configuration by inserting portions of one of said plurality of members into parallel, axially oriented, circumferentially spaced slots in a revolving cylindrical drum heated to a temperature sufficient to soften the plastic members and allow re-orientation thereof, while rotating said drum, and continuously passing the netting over said heated slotted drum to remove the generally-arcuate configuration.

3. The method in claim 1, wherein said step of continuously extruding a plurality of parallel plastic louver members includes the continuous extruding of partial louver elements of elongated cross section with faces adjacent to each other and having differing coefficients of thermal expansion, and bonding said elements at said faces to form unitary louver members having said top and bottom surfaces and front and rear edges.

References Cited

UNITED STATES PATENTS

| | | | |
|---|---|---|---|
| 2,919,467 | 1/1960 | Mercer | 18—12 |
| 3,060,832 | 10/1962 | Wright et al. | 98—40 |

ROBERT F. BURNETT, *Primary Examiner.*

R. L. MAY, *Assistant Examiner.*

U.S. Cl. X.R.

156—181, 270, 271; 161—166; 264—103, 146, 167